Patented June 20, 1933

1,915,039

UNITED STATES PATENT OFFICE

OLIVER M. URBAIN, OF COLUMBUS, OHIO, ASSIGNOR TO CHARLES H. LEWIS, OF HARPSTER, OHIO

PROCESS OF FLOCCULATING NEGATIVELY CHARGED EMULSOIDS FROM A DISPERSE MEDIUM

No Drawing.    Application filed June 7, 1932. Serial No. 615,949.

This invention relates to and it is the object of the invention to provide a process for flocculating negatively charged emulsoids from a disperse medium.

The term "emulsoids" as employed herein may be defined as solvated colloids, which may be dispersions of solids within a liquid, or of a liquid within a liquid. They are organic in constitution.

In order to flocculate emulsoids it is first necessary to bring them to their critical potential, as well as to their critical hydration. The critical potential need not necessarily coincide with the isoelectric point. The critical hydration point is that point in the hydration of the emulsoids at which they will flocculate, providing they are at their critical potential.

An important feature of the present invention, therefore, relates to the desolvation or dehydration of the emulsoids in the disperse medium. Specifically, the invention contemplates the displacement of the adsorbed solvating water film of the emulsoids by molecules for which the nucleus of the emulsoid has a greater affinity than it has for the water molecules of the solvating film. In other words, the invention contemplates the removal of the solvating water film by the phenomena of preferential adsorption.

When the emulsoids are negatively charged, the water molecules of the solvating film are oriented over the surface of the nucleus of the emulsoid with the positive H ends of the molecules pointed inwardly and tenaciously held by adsorption. In order to displace these water molecules, it is necessary to employ molecules which have one end of such polarity that it will be more strongly adsorbed than the H end of the water molecule, so that preferential adsorption will take place. It is further essential that the negative ends of the molecules used to displace the water molecules must not be subject to solvation. Furthermore, the water displacing molecules must not be dissociated to any appreciable extent in the water of the disperse medium.

It is, of course, possible to flocculate emulsoids without desolvation or dehydration by "salting out" but in so doing, enormous quantities of salts are required, in comparison to the quantity required when the emulsoids are first de-hydrated. For instance, to effect flocculation of agar agar, an emulsoid, one mol per liter of anhydrous $M_gSO_4$ is required. If, however, the agar agar is first desolvated or dehydrated, it can be flocculated by the addition of one millimol per liter of the same salt. The importance, therefore, of desolvating or dehydrating the emulsoids becomes at once apparent.

According to the present invention, the solvating water film of the emulsoids is displaced by incorporating in the disperse medium compounds made up of the esters of aliphatic acids with mono or polyhydroxy derivatives of polycyclic compounds.

The esters of aliphatic acids with mono or polyhydroxy derivatives of polycyclic compounds are formed by the reaction of aliphatic acids with the mono or polyhydroxy derivatives of polycyclic compounds, by the elimination of one or more molecules of $H_2O$ (one acidic H of the aliphatic acid to one OH of the hydroxy derivative of the polycyclic compound), and have the general formula:

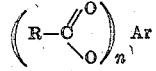

in which, R is an alipahtic hydrocarbon radical, Ar is a polycyclic radical, substituted or unsubstituted, $n$ is the valence of the polycyclic radical and may be 1 or more.

A specific group of compounds well adapted for use in the process are those made up of the esters of fatty acids with the mono or polyhydroxy derivatives of polycyclic compounds.

A specific example of the formation of a suitable compound under the above general formula using an aliphatic acid, not of the fatty acid group, is shown below between acrylyl chloride (chloride of an aliphatic acid) and naphthol which gives naphthyl acrylate.

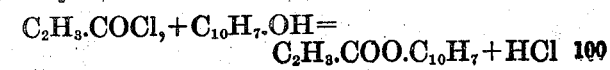

A specific example of the formation of a compound under the above general formula using an ester of a fatty acid, namely caproyl chloride, and 2-naphthol to form 2-naphthyl caproate, is as follows:

$$C_5H_{11}.COCl + C_{10}H_7.OH = C_5H_{11}.COO.C_{10}H_7 + HCl$$

The above reactions are effected in the presence of around 10% KOH and at a temperature of around 10° C.

All compounds conforming to the general formula containing a carbon chain not exceeding eight carbon atoms will function advantageously in the process. The polycyclic residue or radical due to its union with the aliphatic acid, as well as to the plurality of double bonds is polar in nature and possesses many individual centers of polarity. These factors assure strong individual centers of polarity. These factors assure strong adsorption of the molecule, and render it preferentially adsorbed over the positive H of the water molecules of the solvating film on the emulsoid. The negative end of the molecules of the compound, namely the acid residue, which is exposed to the aqueous solution after orientation is not subject to solvation.

The above specific examples of compounds formed under the general formula are compounds resulting from the use of a mono hydroxy derivative of the polycyclic compound.

In some instances it may be desirable to employ a compound for desolvating or dehydrating emulsoids which have greater polarity and solubility than possessed by compounds formed with mono hydroxy derivatives of polycyclic compound. Compounds having increased polarity and solubility can be obtained by substituting hydroxy groups for H atoms on the benzene nucleus of the polycyclic structure. For example, if it is found that the polarity and solubility of say 2-naphthyl caproate is insufficient for the desolvation of a specific emulsoid, it is possible to prepare a compound possessing increased polarity and solubility by using in the formation of the compound, the polyhydroxy derivative 1.4 dihydrocynaphthalene.

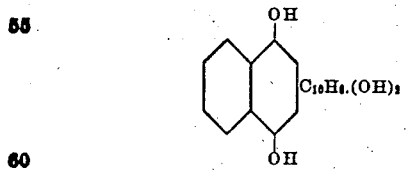

By treating the 1.4 dihydroxynaphthalene with caproyl chloride, mol for mol, in the presence of 10% KOH and at a temperature around 10° C. there is obtained 4-hydroxy-1-naphthyl caproate the reaction being as follows:

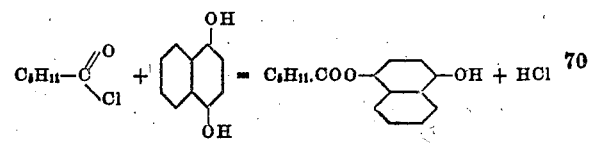

This compound has a greater polarity than the 2-naphthyl caproate and a solubility of about 15% greater.

A preferable compound prepared by the use in the process of the invention is 1-naphthyl butyrate $C_3H_7.COO.C_{10}H_7$.

Other specific examples of compounds conforming to the general formula hereinbefore given, and illustrative of the group derived from the use of the esters of fatty acids are:

1-naphthyl propionate_____$C_2H_5.COO.C_{10}H_7$
1-anthryl valerate_____$C_4H_9.COO.C_{14}H_9$
3-phenanthryl caproate___$C_5H_{11}.COO.C_{14}H_9$ While the step of desolvating emulsoids to facilitate their flocculation has wide adaptation, it is of especial utility with respect to the treatment of organic waste liquid, such as sewage and industrial wastes. It will be appreciated, of course, that the step of desolvating the emulsoid is not alone sufficient to effect its flocculation. Accordingly, the complete process of flocculation comprehends not only the initial step of desolvating the emulsoids by the incorporation in the disperse medium of a compound as hereinbefore described, but also comprehends the additional steps of controlling the pH of the solution to permit the flocculation of the desolvated or dehydrated emulsoids by a suitable electrolyte and the final coagulation of the flocculated material.

A specific illustration of the application of the process is as follows: Assuming that it is desired to remove the emulsoid content from a waste liquid, which emulsoid content has a ten day bio chemical oxygen demand of 250 to 300, the desolvating or dehydrating compound, for example 1-naphthyl butyrate should be added in liquid form in an amount from 40 to 60 pounds per million gallons of waste. Thereafter, the waste should be agitated for a period of two to four minutes and have incorporated therein sufficient calcium hydroxide to bring the same to the requisite pH range for the efficient operation of the electrolyte i. e. to a pH range of 8.5 to 9.5. The electrolyte is then introduced with agitation, when ferric chloride is used as electrolyte, 80 to 100 pounds per million gallons of waste should be employed. Following introduction of the electrolyte, the flocculated material may be coagulated by the introduction of an appropriate amount of a suitable coagulant, such for example as aluminum sulphate or ferrous sulphate.

Of course, the quantity of the compound necessary to desolvate or dehydrate the emulsoids, will vary with the concentration of the emulsoids in the liquid to be treated. To determine the exact amount of the desolvating or dehydrating compound to employ, it is only necessary to make up a solution of the compound of known strength, and add this solution to a known volume of the emulsoid dispersion in gradually increasing amounts and check the reading on a nephelometer with a colorimeter attachment, until no further turbidity increase is noticed. This will be the point at which desolvation or dehydration is complete, and the necessary quantity of the compound required can thus be computed from the known volume of the known strength solution of the compound used in the experiment.

What I claim as my invention is:

1. In a process for flocculating negatively charged emulsoids the step which comprises incorporating in the disperse medium a compound made up of an ester of an aliphatic acid with an hydroxy derivative of a polycyclic compound.

2. In a process for flocculating negatively charged emulsoids the step which comprises incorporating in the disperse medium a compound made up of an ester of an aliphatic acid with a polyhydroxy derivative of a polycyclic compound.

3. In a process flocculating negatively charged emulsoids the step which comprises incorporating in the disperse medium an ester of a fatty acid with an hydroxy derivative of a polycyclic compound.

4. In a process flocculating negatively charged emulsoids the step which comprises incorporating in the disperse medium an ester of a fatty acid with a polyhydroxy derivative of a polycyclic compound.

5. In a process flocculating negatively charged emulsoids the step which comprises incorporating in the disperse medium naphthyl acrylate.

6. In a process flocculating negatively charged emulsoids the step which comprises incorporating in the disperse medium a 1-naphthyl butyrate.

7. A process for flocculating a negatively charged emulsoid from a disperse medium comprising incorporating in the disperse medium an ester of an aliphatic acid with an hydroxy derivative of a polycyclic compound, then agitating, incorporating calcium hydroxide to raise the pH of the solution to from 8.5 to 9.5 adding an electrolyte with further agitation and finally effecting coagulation.

8. A process for flocculating a negatively charged emulsoid from a disperse medium comprising incorporating in the disperse medium a compound made up of an ester of an aliphatic acid with a polyhydroxy derivative of a polycyclic compound, then agitating, incorporating calcium hydroxide to raise the pH of the solution to from 8.5 to 9.5 adding an electrolyte with further agitation and finally effecting coagulation.

OLIVER M. URBAIN.